United States Patent [19]
Bellhouse

[11] Patent Number: 4,636,310
[45] Date of Patent: Jan. 13, 1987

[54] TRANSFER MEMBRANE APPARATUS

[76] Inventor: Brian J. Bellhouse, The Lodge, North St., Islip, Oxfordshire, Great Britain, OX5 2SQ

[21] Appl. No.: 629,837

[22] PCT Filed: Dec. 7, 1983

[86] PCT No.: PCT/GB83/00325
§ 371 Date: Jun. 29, 1984
§ 102(e) Date: Jun. 29, 1984

[87] PCT Pub. No.: WO84/02276
PCT Pub. Date: Jun. 21, 1984

[30] Foreign Application Priority Data
Dec. 7, 1982 [GB] United Kingdom ............... 8234893
Dec. 7, 1982 [GB] United Kingdom ............... 8234892

[51] Int. Cl.$^4$ ............................................. B01D 13/00
[52] U.S. Cl. ............................. 210/321.3; 210/456; 210/493.1
[58] Field of Search ............... 422/48; 210/34.3, 493.1, 210/456

[56] References Cited

U.S. PATENT DOCUMENTS

| | | | |
|---|---|---|---|
| 3,724,673 | 4/1973 | Ryon | 210/321.3 |
| 3,907,687 | 9/1975 | Hoeltzenbein | 210/321.3 |
| 3,910,841 | 10/1975 | Esmond | 210/321.3 |
| 4,075,091 | 2/1978 | Bellhouse | 210/19 |
| 4,115,273 | 9/1978 | Winstead | 210/34.3 |
| 4,351,797 | 9/1982 | Bellhouse et al. | 422/48 |
| 4,357,239 | 11/1982 | Bellhouse | 210/321.3 |
| 4,383,921 | 5/1983 | Bellhouse et al. | 210/456 X |
| 4,447,326 | 5/1984 | Riede et al. | 210/493.1 X |

FOREIGN PATENT DOCUMENTS

| | | | |
|---|---|---|---|
| 2842118 | 4/1979 | Fed. Rep. of Germany | 210/321.3 |
| 2754220 | 6/1979 | Fed. Rep. of Germany | 210/321.3 |
| 2810949 | 10/1979 | Fed. Rep. of Germany | 210/321.3 |
| 2368284 | 5/1978 | France | 210/321.3 |
| 2370497 | 6/1978 | France | 210/321.3 |
| 8001042 | 5/1980 | PCT Int'l Appl. | 210/321.3 |

Primary Examiner—Frank Spear
Attorney, Agent, or Firm—Jeffers, Irish & Hoffman

[57] ABSTRACT

Transfer membrane apparatus incorporates a number of parallel channels, each channel comprising a first conduit (5) for a first fluid formed between two closely spaced transfer membranes (6). The outer face of each membrane is supported against a profiled plate (7) such that second conduits for a second fluid are provided one on each side of the first conduit (5) between a respective membrane (6) and supporting plate (7). The supporting plates (7) are mounted spaced apart in a stack with the double membranes between each adjacent pair of plates. The transfer membranes (6) are provided as parts of a continuous web (6) of transfer membrane material which is folded in concertina fashion. One set of folds (11) each extends around the front edge of a respective plate (7) and the other set of folds (12) each closes a respective first conduit (5) adjacent to the rear of the stack. Each first conduit (5) is sealed along a narrow zone (16) extending from a point substantially halfway along the front of the stack towards, but short of, the membrane fold adjacent to the rear of the stack. Thus, each first conduit (5) is substantially U-shaped, extending from one side of the front of the stack towards and across the rear of the stack and back to the other side of the front of the stack, or similarly W-shaped. Inlet and outlet manifolds for the first fluid are provided alongside one another across the front of the stack.

12 Claims, 6 Drawing Figures

TRANSFER MEMBRANE APPARATUS

The invention is concerned with apparatus for effecting transfer of heat or mass between two fluids, of which a first one may be blood, through a transfer membrane. When the first fluid is blood, the second fluid will be oxygen, in the case of a blood oxygenator; or dialysate in the case of a dialyser; or water at a suitable temperature in the case of a heat exchanger for blood.

In particular, the invention is concerned with such apparatus incorporating a number of parallel channels, each channel comprising a first conduit for the first fluid formed between two closely spaced transfer membrane sheets with the outer face of each sheet supported against a profiled plate such that second conduits for the second fluids are provided one on each side of the first conduit between a respective membrane sheet and supporting plate. The supporting plates are mounted spaced apart in a stack with the double membrane sheets between each adjacent pair of plates.

In previous commerical constructions of this kind of apparatus, an inlet manifold for the first fluid has been fitted across the full width of the front of the stack and an outlet manifold for the first fluid across the full width of the back of the stack, the first fluid flowing from the inlet manifold through the parallel first conduits, each of elongate cross-section between adjacent pairs of membrane sheets, to the outlet manifold. The first and second fluid conduits have been separated by wrapping each support plate with transfer membrane material to provide the membrane sheets one on each face of the plate and hence one in each of an adjacent pair of channels. Sealing has been achieved by tucking the ends of the double sheet into a slot in the front or rear edge of the respective plate. This provides crevices at the inlet or outlet ends of the first conduits and, when the first fluid is blood, is liable to promote stagnation of blood and potential clotting. The provision of the inlet and outlet manifolds at the front and rear respectively of the stack also makes the plumbing for the first fluid somewhat cumbersome.

I have now appreciated that these problems can be overcome in mass or heat transfer or filter apparatus if the transfer membrane sheets are provided as parts of a continuous web of transfer membrane material which is folded in concertina fashion, one set of folds each extending around the front edge of a respective plate and the other set of folds each closing a respective first conduit adjacent to the rear of the stack; each first conduit being sealed along a narrow zone extending from a point substantially halfway along the front of the stack towards, but short of, the membrane fold adjacent to the rear of the stack, whereby each first conduit is substantially U-shaped, extending from one side of the front of the stack towards and across the rear of the stack and back to the other side of the front of the stack, or W-shaped; and inlet and outlet manifolds for the first fluid being provided alongside one another across the front of the stack.

With this arrangement the essential plumbing for the first fluid can be provided at the front of the stack and the folds of transfer membrane material, extending around the front edges of the plate, provide a faired entry for the first fluid from the inlet manifold into each first conduit and a faired exit of the first fluid from each conduit into the outlet manifold. This materially reduces the stagnation problem when the first fluid is blood.

The inner surfaces of the membrane material in each first conduit may be provided with a repetitive series of hollows, such as dimples, and the first fluid may be pumped through the conduits with a pulsatile component, superimposed on the mean flow, to promote vortex mixing of the first fluid in the first conduit, as described generally in GB-A-1,442,754.

In this case, the hollows in the membrane material may be preformed, or formed in situ by expansion of the membrane material partly into corresponding profiling of the plates.

The second fluid will preferably flow in countercurrent to the mean flow of the first fluid, through similarly U-shaped conduits formed on either side of and superposed over each first conduit. In that case, if desired, inlet and outlet manifolds for the second fluid are connected to the second fluid conduits at the sides of the stack adjacent to the front of the stack.

One example of apparatus according to the present invention will now be described with reference to the accompanying drawings, in which:

FIG. 5 is a detailed sectional view of a pair of plates of the apparatus shown in FIG. 1 with the membrane between.

Figure 1:
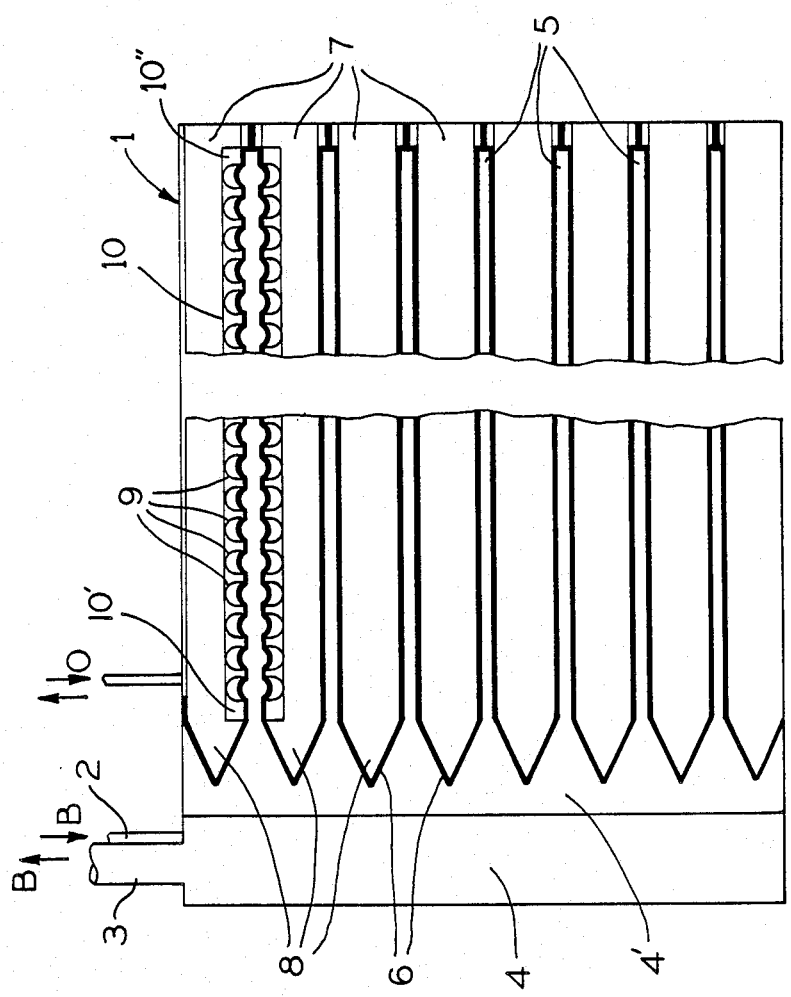
FIG. 1 shows a side sectional elevation of the apparatus.

The apparatus shown in FIG. 1 forms part of an artificial lung and has a rectangular housing 1 with an inlet 2 and outlet 3 through which blood is fed to the housing. Manifolds, separated by a wall 4 with a rubber sealing portion 4', enable blood to be supplied to a stack of U-shaped conduits 5 formed by a polypropylene microporous membrane 6 which is disposed in a sinuous folded path around the front of and between a plurality of stacked, spaced apart, plates 7. Each of the plates 7 is injection moulded from polycarbonate and has a tapered front end 8 which provides faired inlet and outlet portions to the U-shaped conduits 5 formed between the plates 7 by the membrane 6.

Figure 4:
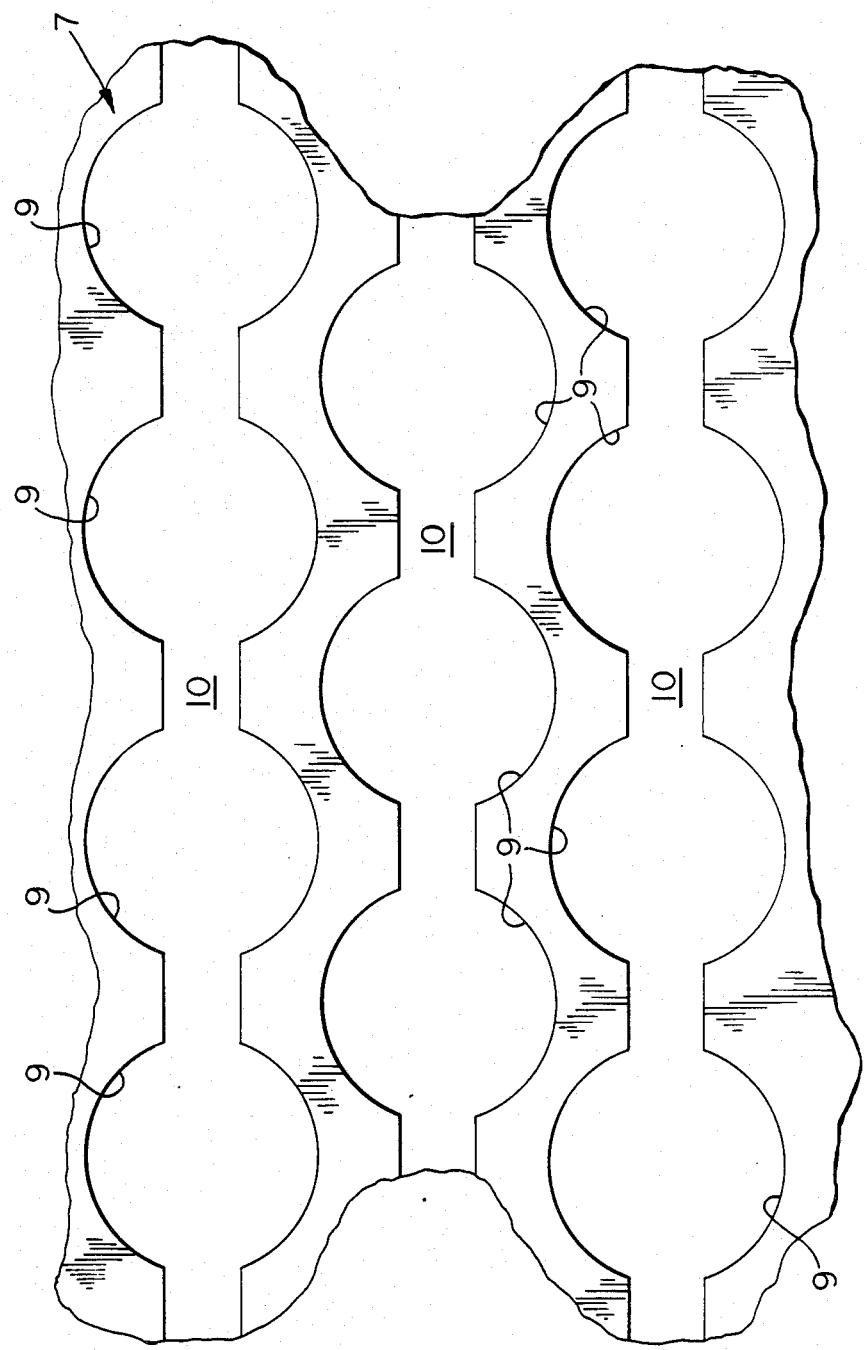
FIG. 4 shows, in plan, part of a support plate for the membrane in greater detail.
Figure 5:
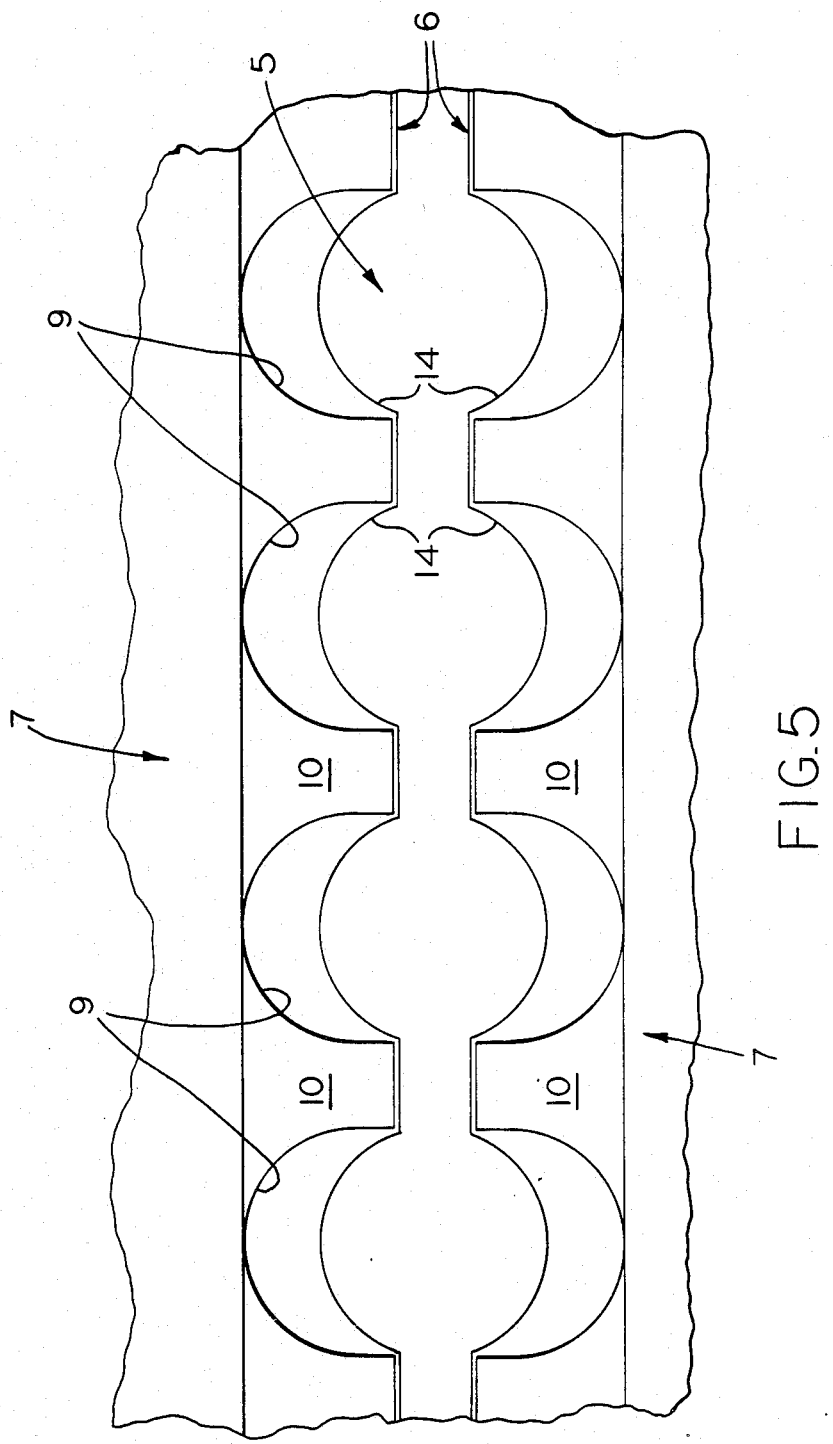

As shown in greater detail in FIGS. 4 and 5, each of the plates 7 is formed with a plurality of part-spherical depressions 9 extending in rows from a point just adjacent the front of the plate to a point well spaced from the rear of the plate. As shown in FIG. 2B and FIG. 4 the depressions 9 in adjacent rows are closely packed, so that adjacent depressions 9 are substantially equi-distantly spaced apart, by offsetting adjacent rows by half the spacing between the centres of adjacent depressions in each row. Connecting the depressions along each respective row is a groove 10 formed to the same depth as the depressions 9. For simplicity, the depressions 9 are shown only in the top pair of plates in FIG. 1 and, at that, only diagrammatically. FIGS. 4 and 5 illustrate the formation of the depressions and grooves more accurately as they are drawn to a larger scale.

To feed oxygen to the grooves 10 and depressions 9, manifold apertures 20 are formed in the front side edges of each plate as shown in FIG. 2B. Grooves 10' feeding the oxygen from the apertures to the front ends of the slots 10 and grooves 10" feeding the oxygen across the rear of the plate between the two sides of the U-shaped path.

Figure 2A:
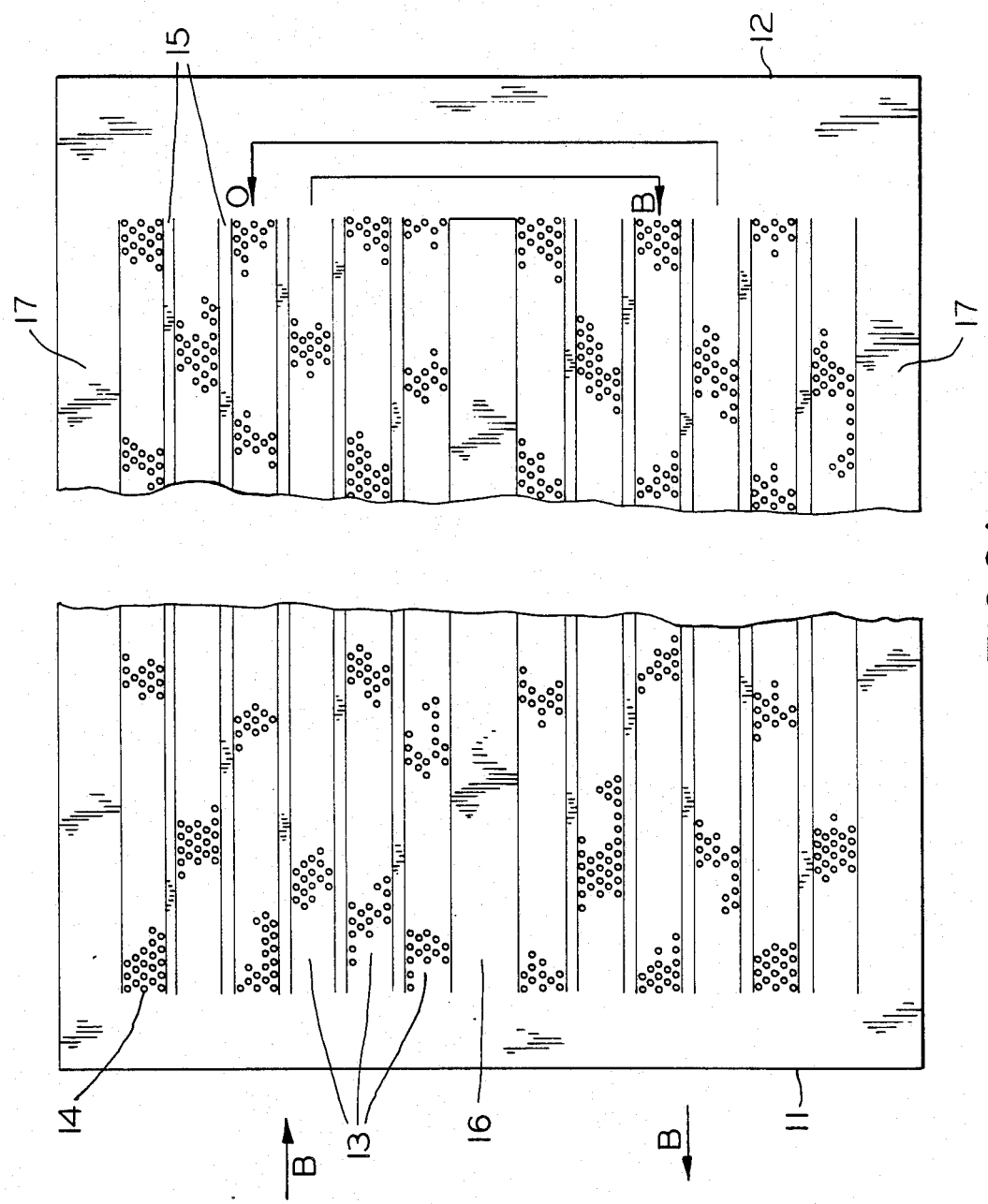
FIG. 2A shows a plan view of a membrane used in the apparatus.
Figure 2B:
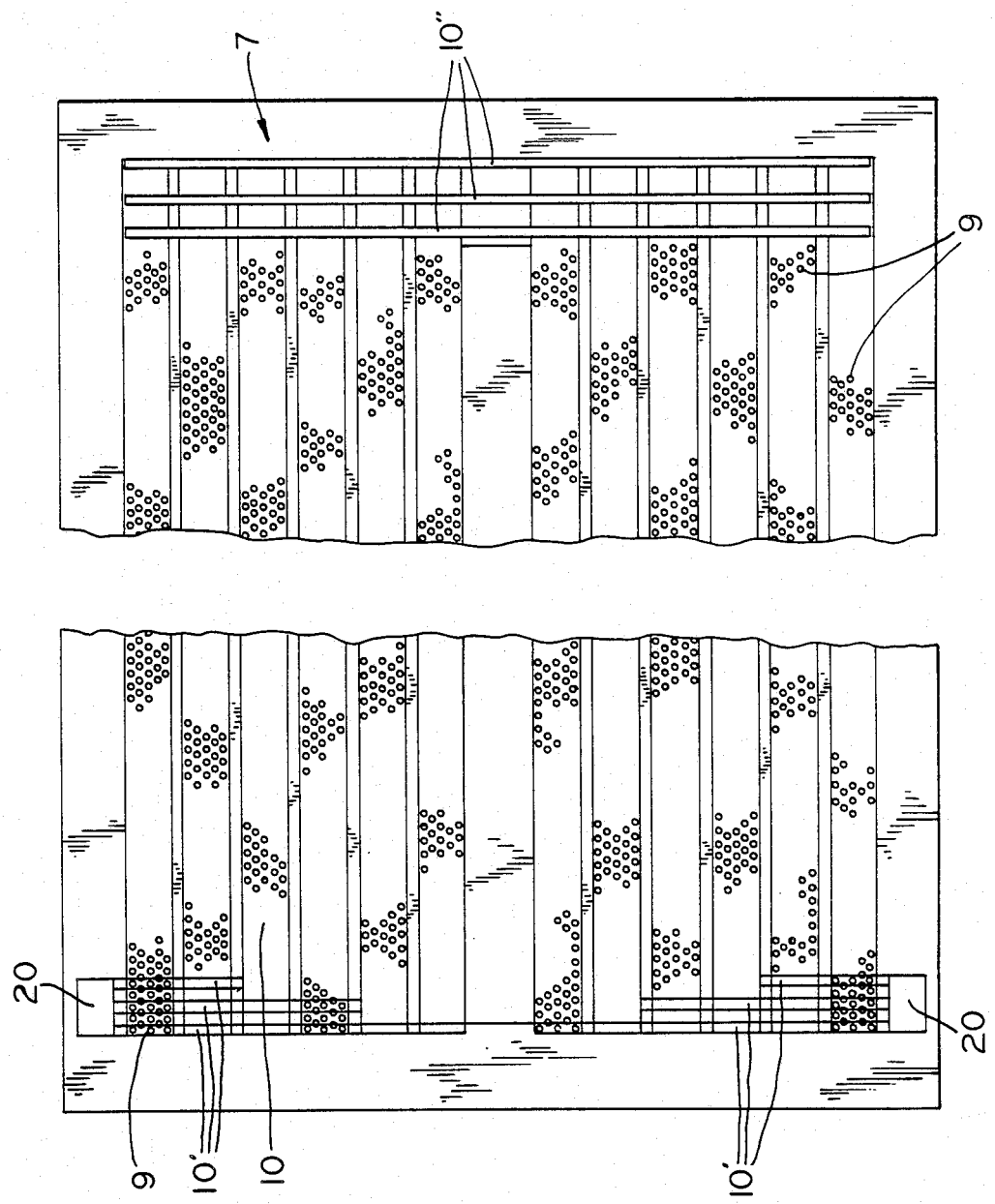
FIG. 2B shows a plan view of a plate used in the apparatus.
Figure 3:
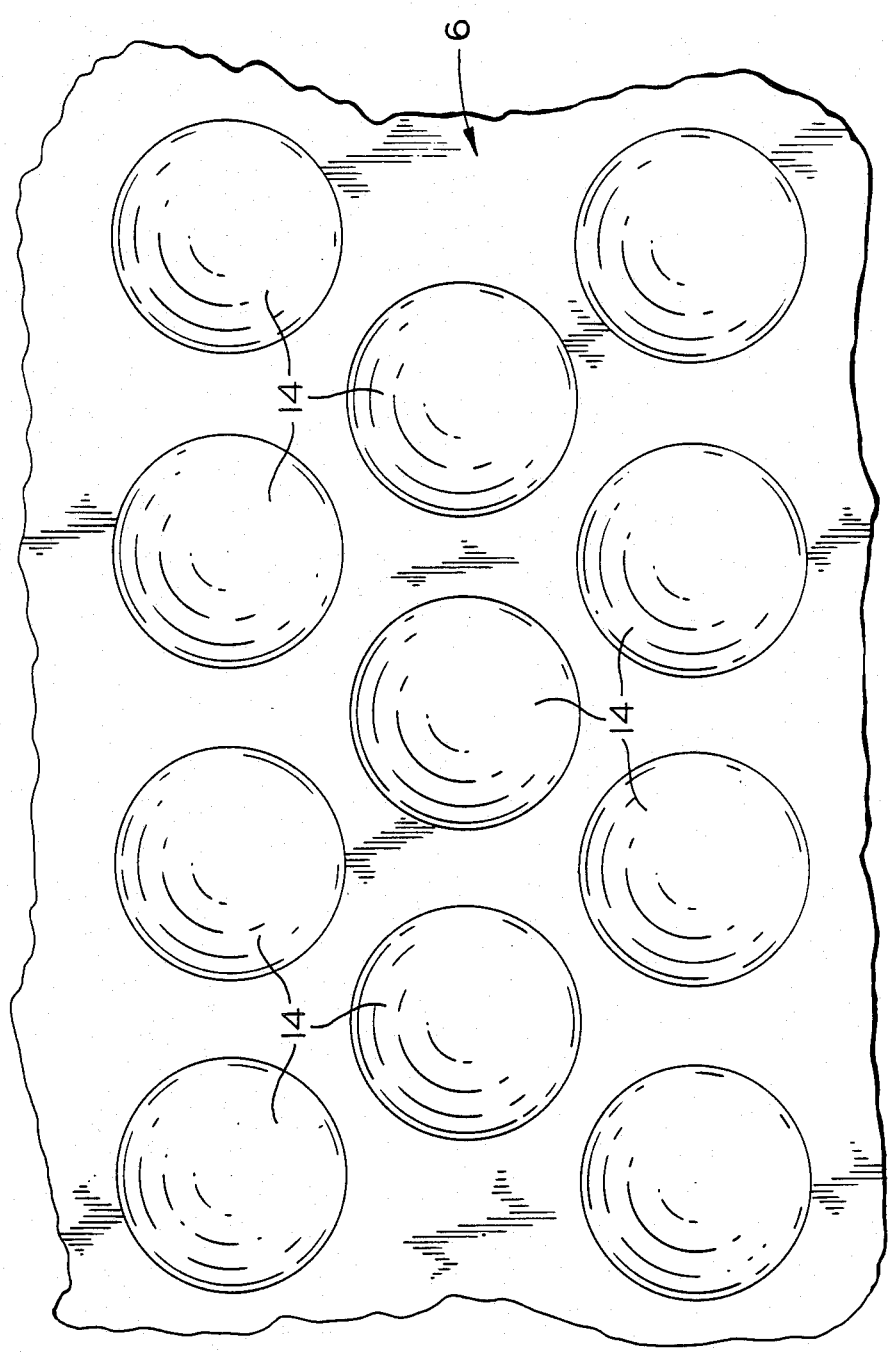
FIG. 3 shows, in plan, a part of the membrane in greater detail.

The membrane 6 is laid-up in a sinuous path between the plates 7 as shown in FIG. 1 and each conduit 5 is formed in a U-shape as shown more particularly by FIG. 2 which illustrates, in plan, one side of one of the conduits formed by the membrane 6. The membrane 6 is held between the plates by rubber gaskets which press against the two membrane portions and squeeze them together to form a seal. At either end of the side portion of the conduit-forming membrane sheet 6 are fold lines 11,12 about which the membrane is folded at the front of the stack of plates and at the back respectively. The arrows B in FIG. 2 illustrate the flow path of blood from and to the inlet and outlet manifolds within the conduit formed by the two superimposed areas of the membrane 6 which lie between a respective pair of the plates 7. In longitudinally extending areas 13 the membrane is dimpled outwardly of the conduit, the dimples 14 being provided, as with the depressions in the plates 7, in longitudinally extending rows, adjacent rows being offset by half the distance between the centres of the dimples. The dimples 14 are preferably formed in the membrane prior to it being folded and stacked with the plates 7, but it is envisaged that when the membrane is formed of thermoplastic materials, the dimples could be formed in situ from an essentially planar membrane, by passing, for example hot water, under pressure through the conduits after initial assembly so as to stretch the membrane into the depressions 9 to form the dimples 14.

Longitudinal ribs 15 separate the adjacent longitudinal dimpled sections 13 and in the centre of the membrane a wider rib portion 16 is provided, the two sheet portions of the membrane 6 which form each side of a conduit being sealed to one another along this portion 16 so as to define the generally U-shaped path for the blood. Each of the plates 7 has a corresponding rib portion (not shown) of substantially the same length as the portion 16, the opposed rib portions on adjacent plates squeezing the membrane between them so as to produce the seal along the portion 16. Side portions 17 on each side of the conduit are likewise sealed between corresponding side portions of adjacent plates 7 to seal the edges of the conduit.

As indicated by the arrows O in FIG. 2, the flow of oxygen through the artificial lung also follows a U-shaped path around each conduit 5, the oxygen being fed from the apertures 20, through the grooves 10', under the dimpled portions 14, through the depressions 9 and the grooves 10, and across the undimpled portion 18 of the conduit through the grooves 10" and then back down a similar path on the other side. Oxygen is fed to the apertures through suitable ducts (not shown).

In the particular example shown the dimples in the membrane sheet 6 and the depressions 9 are arranged in alignment with one another so that, as shown in FIG. 5, the dimples 14 extend partly into the depressions 9. Each of the dimples and depressions has a diameter of substantially 1.5 mm., the dimples having a depth of 0.5 mm. and the depressions a depth of 1 mm., the grooves 10 having a width of 0.5 mm. and a depth, the same as the depressions, i.e. 1 mm. The portions of the plates 7 which have the depressions formed in them are spaced apart a distance of 0.5 mm.

In use, blood is pumped through the artificial lung preferably with a pulsatile flow, for example, by means of a pair of rolling-diaphragm piston pumps which may be located in the respective manifolds and which are operated in anti-phase to produce oscillating blood flow inside the lung. Blood will thus flow in a plurality of U-shaped paths through the conduits 5 formed by the folded membrane 6. The blood flows with a mean flow velocity through the conduits 5, but the superimposed reciprocatory component causes the blood alternately to accelerate and decelerate and this sets up eddies or vortices in the dimples 14 to promote intimate mixing of the blood and contact between the blood and the transfer membrane. At the same time oxygen is pumped in a steady stream through the housing in countercurrent to the flow of blood, also in U-shaped paths between the conduits 5 formed by the membrane and the plates 7. The countercurrent flow of oxygen produces good transfer through the membrane walls of the conduits.

I claim:

1. Transfer membrane apparatus incorporating a plurality of parallel channels, each channel comprising a first conduit (5) for a first fluid formed between two closely spaced transfer membranes (6) with the outer face of each membrane supported against a profiled plate (7) such that second conduits for a second fluid are provided one on each side of the first conduit (5) between a respective membrane (6) and supporting plate (7), the supporting plates (7) being mounted spaced apart in a stack with the double membranes between each adjacent pair of plates, the transfer membranes (6) which are supported against opposite faces of each plate being provided as parts of a continuous web (6) of transfer membrane material which is folded around the front edge of the respective plates (7); and inlet and outlet manifolds for the first fluid being provided alongside one another across the front of the stack, characterised in that each first conduit (5) is sealed along a narrow zone (16) extending from a point midway along the front of the stack towards, but short of, the rear of the stack, whereby each first conduit (5) is substantially U-shaped, extending from one side of the front of the stack towards and across the rear of the stack and back to the other side of the front of the stack; and in that the folds (11) of transfer membrane material (6) extending around the front edges of the plates (7) provide a faired entry for the first fluid from the inlet manifold (4) into each first conduit (5) and a faired exit for the first fluid from each first conduit (5) into the outlet manifold (4); the entry and exit together extend across the full width of the conduit; and the inlet and outlet manifolds together extend across the full width of the conduits and are spaced from the front edges of said plates and membrane material extending therearound.

2. Apparatus according to claim 1 wherein a pair of similarly U-shaped second conduits are formed on either side of and superposed over each first conduit (5), between the membrane (6) and the adjacent plate (7).

3. Apparatus according to claim 2, wherein inlet and outlet manifolds for the second fluid are connected to the second fluid conduits at the sides of the stack adjacent to the front of the stack.

4. Apparatus according to claim 1, wherein the membrane on each side of the first conduit (5) presents in its surface facing sheet a regular array of close packed depressions (14).

5. Apparatus according to claim 4, wherein each of the depressions (14) in one membrane faces a similar depression (14) in the other membrane.

6. Apparatus according to claim 4 or claim 5, wherein the depressions (14) in each membrane are provided in rows extending side by side to one another along the direction of mean flow through the conduit (5), the depressions (14) in adjacent rows being longitudinally offset halfway between adjacent depressions in the adjacent rows so that lateral nesting of adjacent rows occurs.

7. The apparatus according to claim 6 wherein the profiled surfaces of the plates (7) are provided by depressions (9) in alignment with the depressions in the respective membrane sheets (6) supported thereon.

8. The apparatus according to claim 7 wherein the depressions (9) in the plates (7) are interconnected by grooves (10).

9. The apparatus according to claim 8 wherein the depressions (9) in the plates (7) are arranged in longitudinal rows along the direction of mean flow along the assembly, the grooves (10) interconnecting one depression to the next along the respective row.

10. Apparatus according to claim 4 or claim 5 wherein the profiled surfaces of the plates (7) are provided by depressions (9) in alignment with the depressions in the respective membrane sheets (6) supported thereon.

11. Apparatus according to claim 10, wherein the depressions (9) in the plates (7) are interconnected by grooves (10).

12. Apparatus according to claim 11, wherein the depressions (9) in the plates (7) are arranged in longitudinal rows along the direction of mean flow along the assembly, the grooves (10) interconnecting one depression to the next along the respective row.

* * * * *